United States Patent
Wang et al.

(10) Patent No.: US 6,903,298 B2
(45) Date of Patent: Jun. 7, 2005

(54) RESISTANCE WELDING CONTROL METHOD

(75) Inventors: Pei-Chung Wang, Troy, MI (US); Robert T. Thornton, Auburn Hill, MI (US); Kenneth R. Schmidt, Macomb, MI (US); Samuel Paul Marin, Oakland Township, MI (US)

(73) Assignee: General Motors Corporation, Detroit, MI (US)

( * ) Notice: Subject to any disclaimer, the term of this patent is extended or adjusted under 35 U.S.C. 154(b) by 113 days.

(21) Appl. No.: 10/647,706

(22) Filed: Aug. 25, 2003

(65) Prior Publication Data

US 2005/0045597 A1 Mar. 3, 2005

(51) Int. Cl.$^7$ ............................................... B23K 11/24
(52) U.S. Cl. .................................... 219/110; 219/86.32
(58) Field of Search ........................ 219/86.23, 86.41, 219/86.51, 109, 110

(56) References Cited

U.S. PATENT DOCUMENTS

| | | | | |
|---|---|---|---|---|
| 4,596,917 A | * | 6/1986 | Nied et al. ................... | 219/109 |
| 4,734,555 A | * | 3/1988 | Ferguson .................... | 219/110 |
| 5,063,279 A | * | 11/1991 | Rossi ....................... | 219/86.51 |
| 5,254,828 A | * | 10/1993 | Stiebel ....................... | 219/110 |
| 5,393,950 A | | 2/1995 | Killian | |
| 5,587,091 A | | 12/1996 | Kawagoe et al. | |
| 6,232,572 B1 | | 5/2001 | Kanjo | |

* cited by examiner

*Primary Examiner*—Clifford C. Shaw
(74) *Attorney, Agent, or Firm*—Kathryn A. Marra

(57) ABSTRACT

This invention provides a method of producing a series of substantially uniform spot welds between two metal parts using a servomotor driven movable electrode and an axially opposing fixed electrode. Target values for electrode displacement in producing a weld indentation and electrode squeeze force are determined for the electrodes and workpieces. During welding operations electrode displacement and electrode force measurements are continually taken and compared with the displacement and force target values. While the measured values are within a tolerance range of the target values, welding is continued using the preset parameters. When either or both of the measured electrode displacement or force value falls outside the target range the total welding current is adjusted in small increments to correct the displacement and/or force values and, thereafter, welding is continued using the new total welding current.

7 Claims, 2 Drawing Sheets

RESISTANCE WELDING CONTROL METHOD

TECHNICAL FIELD

This invention relates generally to electrical resistance spot welding of sheet metal assemblies and, more specifically, to a control method of producing a sequence of spot welds of substantially uniform weld size and quality.

BACKGROUND OF THE INVENTION

The construction of automotive bodies and other manufacturing operations often requires the formation of many uniformly sized electrical resistance spot welds. The welds (or weld nuggets) are made by bringing one or more assemblies of sheet metal parts to a welding station where a computer controlled robot, or other welding machine(s), systematically and sequentially forms a series of spot welds to attach the parts of the assembly or assemblies into integral bodies.

The welding is performed using a weld gun typically having copper or copper alloy welding electrodes (i.e., a fixed electrode and a movable electrode). The electrodes are axially aligned in opposition to each other. They are positioned around a workpiece at a specified spot weld site and the movable electrode is advanced to clamp and press the workpiece against the fixed electrode. A large electric current is momentarily passed between the opposing electrodes through the electrically resistive metal pressed between them. The sheet metal between the electrodes is briefly fused during current flow and then re-solidified to form an integral weld nugget of suitable diameter at the faying surfaces of the sheet metal layers. In such a manufacturing operation, scores or hundreds of such welds are rapidly formed. The goal is to form all of the welds to substantially the same size, within an acceptable tolerance value, and with minimal internal porosity or discontinuities.

Welding controllers are used to control the force applied by the movable electrode on the metal surface at the weld site. The controller also is programmed to control the weld current and its duration. The force applied to the welding site by the electrode and the resistive heat generated by the welding current results in an indentation (caused by the displacement of the electrode) in the softened welded surface of the workpiece at the location of the weld nugget. In setting up the welding machine to produce a series of uniform welds, initial values of suitable electrode force, total welding current, and its duration are established for the welding gun and the specific workpieces. The welding controller can be programmed in an attempt to maintain these values so that the same welds are produced during extended manufacturing operations. But variations creep into the operation because of electrode wear and workpiece gap and orientation. Furthermore, there may also be variations in the operation of the welding machine(s).

Weld nugget uniformity and quality can be confirmed off-line from the production operation by periodically removing the workpieces from the operation and physically examining and testing a number of weld nuggets. But it would be preferable to have an on-line process that could be performed during welding operations using a computer-based weld controller to assess welding conditions and correlate them, if possible, to weld nugget quality and size.

Thus, it is an object of the present invention to provide a method of controlling on-going welding operations as a sequence of spot welds are formed to compensate for variations in the process so as to reduce variations in the size and integrity of the individual weld nuggets. It is a further object of the present invention to provide a control method that can be performed by a suitable weld controller and can easily be implemented without stopping the welding operation.

SUMMARY OF THE INVENTION

This invention provides a method of reducing variation in a series of spot welds by controlling certain welding parameters. The method uses the recognition that there is a correlation between the weld indentation at a weld nugget made by a particular welding electrode and the size and quality of the underlying weld nugget. It is further recognized that the indentation produced by the displacement of the electrode during welding is a function of the force applied by the electrode on the workpiece during welding and the total weld current, as well as its duration, used to form the weld nugget.

A suitable weld controller manages the total welding current and its duration. The force applied by the weld electrode is also managed by the weld controller and measured by a suitable load cell placed between the movable electrode and the holder into which it is inserted. The indentation in the workpiece surface is suitably measured by the displacement (i.e., the advancement) of the movable electrode as it applies an electrode force and welding current is passed through the weld site of the workpiece. Electrode displacement during welding is usually relatively small, typically a fraction of a millimeter, and is to be accurately measured. Accordingly, the subject process is best performed using a welding gun in which the movable electrode is advanced using a servomotor. The movement of the electrode in displacing weld material is accurately determined from precise measurement of the rotation of the servomotor that drives the electrode.

The welding control method of this invention is best used during a sequence of spot welds in a manufacturing operation. In such an operation, initial target values for total welding current and its duration, electrode force, and electrode displacement (to obtain the desired weld indention) are determined for the welding equipment to be employed and the workpieces to be welded. These values are stored in the database of the welding controller. Welding operations are started using the predetermined welding parameters. Workpieces are placed between the welding electrodes and repositioned and removed as spot welds are made. The moveable electrode closes on a weld site to make the spot weld and opens for repositioning or replacement of the workpiece. The welding controller continues to apply an electrode force by a measured electrical impulse to the servomotor and to control the total weld current and its duration. Movable electrode displacement data, which produces a weld indentation, during welding and force data are routinely gathered. At suitable intervals during the spot welding operations, the electrode displacement and force data are compared in the controller with the predetermined desired, or target, values. If either the electrode displacement value or the force value differs from their preset values by more than a tolerable variance, a small incremental adjustment is made in the total welding current for the next spot weld and, following that weld, electrode displacement and force data are again evaluated.

When electrode displacement is low, or electrode force is high, the controller commands an incremental increase in total welding current. For example, if the total current is currently 26.5 kA, an increase of about 250 A may be commanded. When electrode displacement is high, or electrode force is low, an incremental decrease in total current of a like amount is imposed. Such incremental changes in the total welding current are made until measured values of electrode displacement and force are both within the tolerance ranges of the predetermined values. Thereafter, spot welding proceeds at the new total current value until a need for further changes are required as determined from on-going electrode displacement and force data.

This method of monitoring servo movable electrode displacement and load cell force values enables spot welding operations to proceed while producing suitable weld nuggets of substantially uniform size. The process is continually ongoing so that only small corrections are required and the overall welding operation is stabilized. Furthermore, the control method is easily performed by the welding controller without interrupting welding operations. Welding operations are stopped only when adjustment of the weld current does not work to correct the electrode displacement and force values. This method has proven to be very useful and successful in maintaining spot weld nugget quality in a long sequence of spot welding operations.

These and other objects and advantages will become apparent from the detailed description that follows.

DESCRIPTION OF A PREFERRED EMBODIMENT

The present invention provides a method of controlling welding parameters while producing a series of substantially uniform spot welds in a workpiece and/or a series of workpieces. It is found that weld nugget size in a series of spot welds can be reliably controlled by monitoring the electrode displacement and electrode squeeze force during a weld and adjusting the welding current for a succeeding weld in the event that either or both of these parameters fails to suitably match predetermined displacement and force values. A weld nugget of suitable size and quality is produced when both the electrode displacement and the squeeze force values are within suitable ranges.

During the welding operation the movable electrode is advanced a small amount by the servomotor to apply a predetermined force on the parts. The inward movement (displacement) of the electrode during welding leaves an impression at the site called weld, or surface, indentation. After the current is stopped the movable electrode is withdrawn for removal or repositioning of the workpiece. A weld nugget of suitable size and integrity remains.

In the automotive industry, carbon steel alloy sheets and aluminum alloy sheets are often formed into various body parts and panels and subjected to such a series of welding operations. The thicknesses of the sheets may vary from about 0.5 mm to more than 4 mm depending upon the composition and physical requirement of the sheet material. Accordingly, welding conditions must accommodate the thickness of the layers to be joined. Electrode forces may vary in the range of 300 lbs to 2500 lbs and the total weld current may vary from 5,000 A to more than 45,000 A. Welding current is often a direct current produced by rectifying a suitable alternating current, or regular alternating current. When 60 Hz current is used, for example, each weld is typically formed in about 5 to 40 cycles (i.e., a fraction of a second) of such current application. Again, the number of welding cycles is dependant upon the type and thickness of the metal part.

Figure 1:
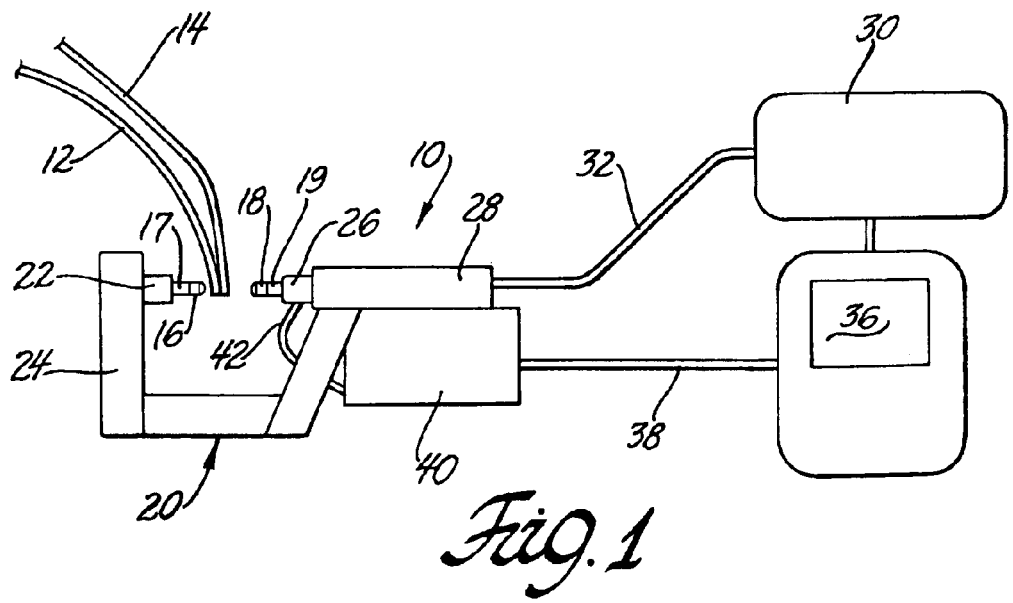
FIG. 1 is a schematic diagram of a side view of a representative spot welding gun apparatus with the associated equipment used in spot welding operations.

A schematic illustration of a side view of a representative spot welding gun apparatus 10 with the associated equipment utilized in spot welding operations is shown in FIG. 1. In such an operation, an assembly of two or more sheet metal layers to be welded is prepared at a suitable location and transported by means, not shown, to the welding gun apparatus 10. In this example, the assembled sheets consist of two relatively thick sheets (e.g., each 2 mm thick) 12, 14 of a formable commercial mild steel. The assembled sheets may be previously stamped inner and outer panels for a vehicle body closure member. In such a job, many spot welds would be formed around the periphery of the assembled sheets before they are removed and replaced at the welding gun with the next job. Assembled sheets 12 and 14 are shown in side view in FIGS. 1 and 2.

In FIG. 1, the assembled sheets 12, 14 are shown placed between axially aligned and opposing electrodes 16, 18 of welding gun arm 20. It is seen that gun arm 20 is in the configuration of a "C" so that opposing electrodes 16, 18 can be brought to bear and press on opposite sides of the overlapped assembled sheets 12, 14.

In the arrangement shown, electrode 16 is mounted on a shank 17 which is inserted in a holder 22 attached to a fixed arm 24 of welding gun arm 20. The other electrode 18 is mounted on shank 19 and inserted in another holder 26 carried in a servomotor drive cylinder 28. Servomotor drive cylinder 28 is adapted to axially move electrode 18 into clamping engagement with the outer surface of sheet 14. Drive cylinder 28 includes a servomotor and, for example, a helical drive to move electrode 18. An electrical current is commanded by process controller 30 and delivered through conductor wire 32 to the servomotor, not shown but contained within drive cylinder 28.

Servomotors are available to accurately and precisely move electrode 18 from an open position for location of a workpiece to a closed position for making a spot weld. Moreover, such a servomotor can be controlled to turn a specified amount to exert a desired force on the surface of the workpiece, and the motion of the servomotor during the formation of a spot weld can be accurately measured using process controller 30. Movable electrode holder 26 contains a load cell, not shown, suitably positioned for detecting the amount of force that electrode 18 applies against sheets 12, 14.

The welding gun arm 20, shown in FIG. 1, may be stationary or it may be applied on the end of a robot arm. In either arrangement, a spot weld process controller 30 is associated with welding gun arm 20 to suitably execute a spot welding operation. As illustrated in this FIG. 1, robot/machine process controller 30 is programmed or used to initiate and control the movement of the robot or the actuation of the welding machine to engage or to receive the assembled sheet metal parts. Process controller 30 manages and actuates servomotor cylinder 28 and a welding current controller 36.

Welding current controller 36 regulates the passage of a primary welding current from a remote source, not shown. The welding energy source may be 60 Hz, high voltage, low current alternating current. Upon command of welding controller 30, the primary current is delivered through primary current line 38 to weld transformer 40. Weld transformer 40 converts the primary current to a lower voltage, but higher current. Furthermore, the alternating current may be converted by a suitable rectifier to a direct current for welding. The secondary welding current is provided through secondary current line 42 and electrode holder 26 as well as conductive gun arm 20 and electrode holder 22. The welding current may be of the order of 5,000 to 45,000 amperes (A) depending upon the requirements of the welding operation. Where 60 cycle alternating current is initially provided, the total welding time for a typical spot weld may, e.g., be from 5 to 40 cycles of the 60 hertz current.

When movable electrode 18 has been brought into contact with sheet 14, controller 30 initiates the spot weld operation. Welding current controller 36 is commanded to deliver a predetermined total current through electrodes 18 and 16. And a pulse of current is delivered through line 32 to the servomotor cylinder 28 to advance movable electrode 18 during welding for the purpose of applying a predetermined squeeze force on sheets 12, 14.

Figure 2:
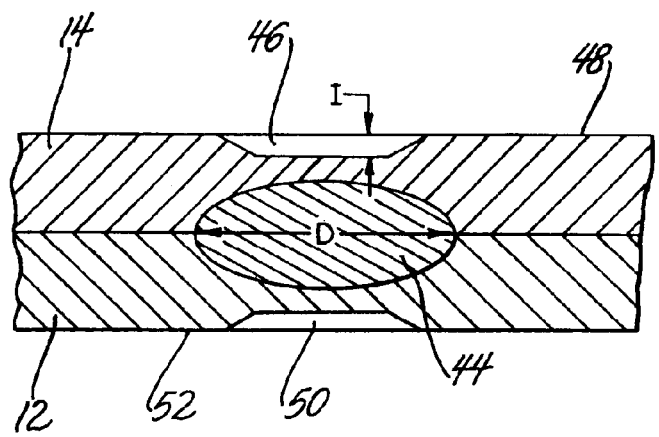
FIG. 2 is an enlarged fragmentary sectional view of two sheet metal parts attached with a spot weld nugget. This view illustrates the diameter, D, of the nugget and indentation, I, of the spot weld site.

A spot weld nugget 44 joining workpieces 12, 14 is shown in the enlarged, fragmentary sectional view of FIG. 2. The nugget 44, elliptical in cross section, is formed at the faying surfaces of workpieces 12, 14. The upper surface 48 of sheet 14 is slightly depressed at surface 46 below the level of surface 48. This indentation (indicated at I) from surface 48 to surface 46 results from the welding force applied by movable electrode 18 and its displacement into the weld heat softened metal. Surface 46 is like a footprint of the tip of movable electrode 18. Similarly, a lower surface region 50 of sheet 12 is indented its bottom surface 52 due to the reactive force of fixed electrode 16.

The tip of welding electrode 18 is usually round and nugget 44 has a diameter, indicated at D, in FIG. 2. Indentation (I) is not measured on the welded pieces 12, 14 but is determined by the advance of servomotor 28 from the time electrode 18 just contacts surface 48 until the completion of the weld as indicated by indentation to surface 46 and the formation of nugget 44. The amount of this advance is the displacement of movable electrode 18. Of course, nugget 44 is formed from fused metal from sheets 12, 14 at the faying surfaces at the weld site. Nugget 44 is larger toward the interface of sheets 12, 14 because weld heat is retained there.

Prior to welding, target values for the displacement of electrode 18 and the squeeze force that it applies are determined for workpieces 12, 14 and the welding electrodes 16, 18. These parameters are based on the desired values of the diameter (D) of the weld nugget and the indentation (I) formed in the workpieces to produce the nugget. An initial value for total welding current is also determined. These target values are predetermined based on setup work with the specific parts and electrodes. This setup data is stored as electrode displacement and weld force target values in process controller 30. For example, if sheets 12, 14 are of mild steel and each is 1 mm thick the target weld nugget diameter D may be 4 mm. The electrodes 16, 18 each have a face diameter of 9.53 mm. The setup total weld current may be 10.5 kA of AC current over approximately 16 of the 60 HZ cycles and the target electrode squeeze force as measured by the load cell in holder 26 may be 670 lbs seeking an electrode displacement of 0.1 mm to produce a like indentation I in the workpiece surface. These values are used to form an initial series of resistance spot welds in parts 12, 14.

In general, welding operations as described are robust and proceed for many welds without the need for a change in the welding parameters. However, the method of this invention provides a way of confirming whether the welding operation is producing uniform spot weld nuggets. The welding controller 30 is instructed to test electrode weld indentation from time to time to determine whether weld parameters need to be adjusted. The displacement test may conducted, e.g., after 10 welds or so.

Figure 3:
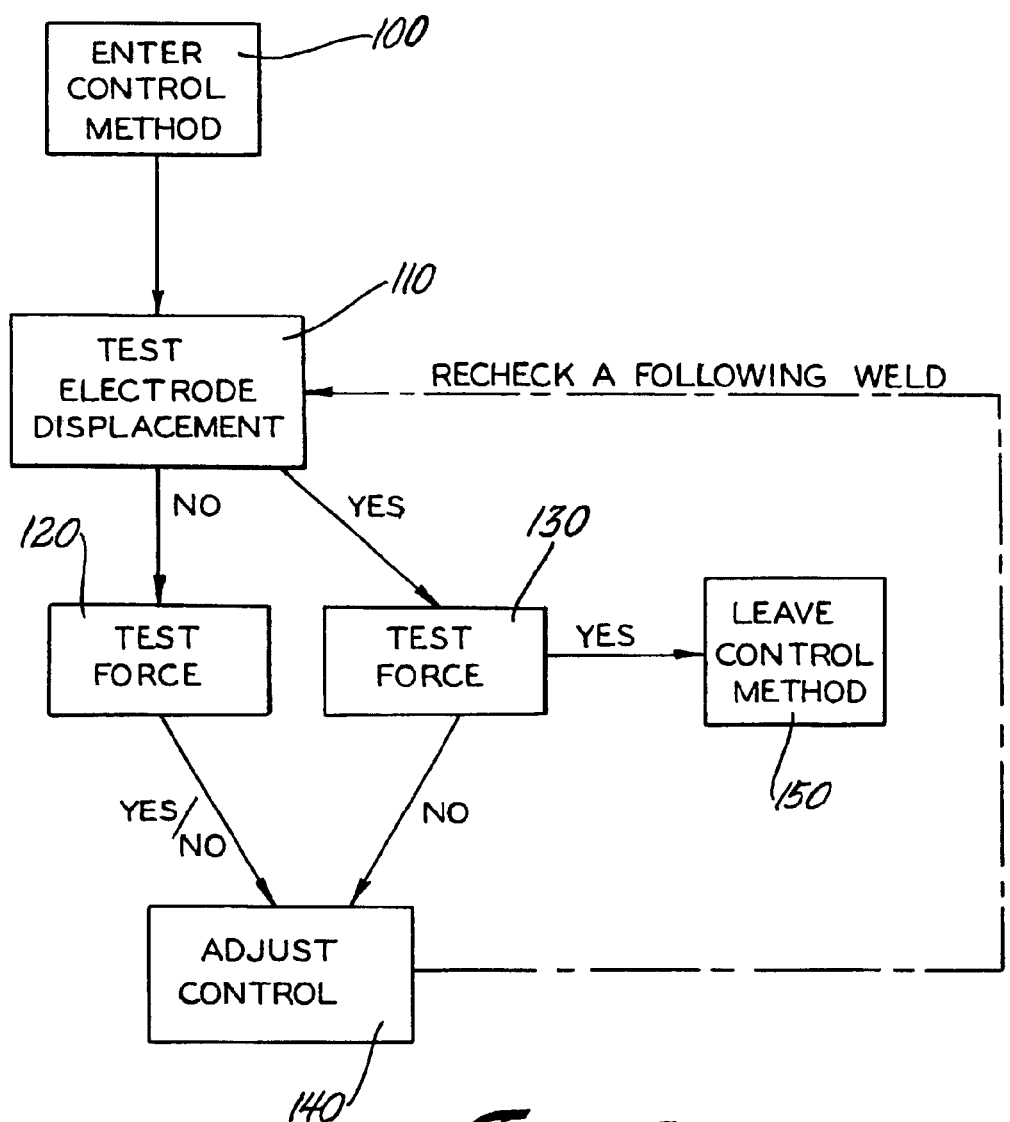
FIG. 3 is a flow diagram illustrating an embodiment of the control process of the present invention.

The control method of the present invention is outlined as a flow diagram in FIG. 3. It is implemented into the welding process at an arbitrary weld N as stated above. The process controller 30, as shown in FIG. 1, will determine what welds will be checked. This may be in a sequential order (e.g., every $10^{th}$ weld) or could be randomly implemented.

When an $N^{th}$ weld is reached, controller 30 will record measurements of electrode displacement and squeeze force and compare those values with the target values. The measured electrode displacement is determined by taking the difference between the electrode position measured before and after welding, as indicated at "I", in FIG. 2, which is the indentation that the electrode makes in the workpiece. The measured force value however, is simply obtained (in lbs.) from the load cell and stored by the controller 30.

In reference now to FIG. 3 and assuming a steel workpiece, the control method is entered at 100 on the $N^{th}$ weld and controller 30 tests the electrode displacement at 110. If the target displacement value is 0.1 mm±0.01 mm (for example) and the measured value satisfies that target, the answer in block 110 is "yes" and the process proceeds to block 130 to test the force value.

If the target force value is 670 pounds±5 pounds (for example) and the measured force for the weld satisfies that target, the answer in block 130 is also "yes" and the process proceeds to block 150—Leave Control Method. Since both test blocks have been answered "yes" the process conditions are satisfied and welding operations proceed without any change in welding parameters. Welding operations continue, for example, until another "N" weld has been made and the controller 30 again enters the process summarized by this flow diagram.

If upon an entering of block 110 the electrode displacement is not within the desired range for weld indentation and nugget size, the controller will then test the force at block 120. If the measured force is within the tolerance range, the process proceeds to block 140 for a command of an incremental change to welding current. In this combination of out-of-tolerance electrode displacement and within-tolerance force value, the current adjustment is based on the measured value of electrode displacement. If the electrode displacement is too low, then current is increased, whereas if electrode displacement is too high, current is decreased.

In this example, the initial or setup value of total welding current was 10,500 A. In accordance with this process small incremental changes in total current are made to correct out of tolerance indentation values or force values. For example, the changes may be in increments of 200 A, less than two percent of the total current. Accordingly, the above current increase or decrease is equal to the pre-determined incremental value. The process then performs at least one weld with the new total current and again enters block 110. This control process is repeated until a weld is made in which both the measured electrode displacement and squeeze force are within tolerances.

If in the above process sequence the electrode displacement value had been out-of-tolerance, in block 110, and the force value was also out-of-tolerance, in block 120, the current adjustment, in block 140, is based on the force value. When the force value is low an incremental reduction of current is commanded, and when the force value is high an incremental increase of current is commanded. Again the process produces at least one weld with the new total current and the control process repeated until both indentation and force are within tolerances.

As another possibility upon entering block 110, if the measured electrode displacement is within the target range, the force is checked at block 130. If the force is too low, current will be decreased at block 140 in incremental values. Likewise, if the force is too high, the current is increased.

The current that is adjusted at 140 based on the electrode displacement and force tests by controller 30 will be implemented for a succeeding weld. The control process continues until a weld is formed that has a suitable electrode displacement and force. Then the welding process leaves the control method at 150 and re-enters the control method after a new predetermined number of welds.

The control method of the present invention permits easy and efficient production of a series of substantially uniform welds without interruption of the welding operation. Checks made on electrode displacement and squeeze force and adjustments to the weld current are made without any stoppage of the welding process. Furthermore, the process requires very little, if any, human intervention when making checks and changes. This speeds up production and maintains high quality welds at the same time.

While this invention has been described in terms of a preferred embodiment, it is not intended to be limited to that description, but only to the extent of the following claims.

What is claimed is:

1. A method of producing a series of electrical resistance spot welds in one or more workpieces, each workpiece being positioned for each weld between a servomotor driven movable electrode and an axially opposing fixed electrode, the method comprising:

setting target values for electrode displacement and electrode force, and an initial total welding current and its duration;

making a pre-determined number of spot welds using a weld controller to apply the welding current between the electrodes and to control the servomotor in applying the electrode force and advancing the movable electrode to make a spot weld indentation in the workpiece with an electrode displacement;

measuring the electrode force and electrode displacement after a spot weld;

comparing the measured electrode force and electrode displacement values with the corresponding target values; and, if either of the force or displacement values are not within a tolerance range of the target values altering said welding current during one or more succeeding spot welds to bring the electrode displacement and/or force values for the succeeding spot welds within said tolerance ranges.

2. The method as recited in claim 1 comprising increasing the welding current if said electrode displacement is less than the electrode displacement target value or the electrode force is greater than the electrode force target value.

3. The method as recited in claim 2 comprising altering said welding current during one or more succeeding spot welds to bring the electrode displacement and/or force values for the succeeding spot welds within said tolerance ranges, and thereafter using the altered total welding current for subsequent spot welds.

4. The method as recited in claim 1 comprising reducing the welding current if said electrode displacement is greater than the electrode displacement target value or the electrode force is less than the electrode force target value.

5. The method as recited in claim 4 comprising altering said welding current during one or more succeeding spot welds to bring the electrode displacement and/or force values for the succeeding spot welds within said tolerance ranges, and thereafter using the altered total welding current for subsequent spot welds.

6. The method as recited in claim 1 comprising comparing the measured electrode force and displacement values with the corresponding target values; and, if both of the force and displacement values are within a tolerance range of the target values continuing to weld said workpieces using said initial weld current and said electrode displacement and electrode force target values, and thereafter continuing to measure said electrode displacement values and electrode force values for comparison with the target values.

7. The method as recited in claim 1 comprising altering said welding current during one or more succeeding spot welds to bring the electrode displacement and/or force values for the succeeding spot welds within said tolerance ranges, and thereafter using the altered total welding current for subsequent spot welds.

* * * * *